(12) United States Patent
Nagahori

(10) Patent No.: US 6,304,964 B1
(45) Date of Patent: Oct. 16, 2001

(54) APPARATUS AND METHOD FOR CONTROLLING INITIALIZATION OF A PROCESSOR SYSTEM

(75) Inventor: Kazuo Nagahori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/128,076

(22) Filed: Aug. 3, 1998

(30) Foreign Application Priority Data

Apr. 13, 1998 (JP) ................................................. 10-101420

(51) Int. Cl.$^7$ ........................................................ G06F 1/24
(52) U.S. Cl. ................................................. 713/1; 713/100
(58) Field of Search .............................. 713/1, 2, 400, 713/600, 601

(56) References Cited

U.S. PATENT DOCUMENTS

| | | | |
|---|---|---|---|
| 4,493,026 | * 1/1985 | Olnowich | 713/500 |
| 4,542,453 | * 9/1985 | Patrick et al. | 364/200 |
| 4,543,627 | * 9/1985 | Schwab | 713/500 |
| 4,688,173 | * 8/1987 | Mitarai et al. | 364/405 |
| 4,802,119 | * 1/1989 | Heene et al. | 364/200 |
| 5,465,360 | * 11/1995 | Miller | 713/1 |
| 5,471,674 | * 11/1995 | Stewart et al. | 395/650 |
| 5,642,506 | * 6/1997 | Lee | 713/1 |
| 5,652,906 | * 7/1997 | Kadosumi | 713/1 |
| 5,812,878 | * 9/1998 | Christiansen | 713/500 |
| 5,884,074 | * 3/1999 | Maeda et al. | 713/2 |
| 5,887,162 | * 3/1999 | Williams | 713/1 |

FOREIGN PATENT DOCUMENTS

| | | |
|---|---|---|
| 4-54553 | 2/1992 | (JP) . |
| 4-282741 | 10/1992 | (JP) . |

\* cited by examiner

*Primary Examiner*—Bipin Shalwala
*Assistant Examiner*—Nitin Patel
(74) *Attorney, Agent, or Firm*—Helfgott & Karas, P C.

(57) ABSTRACT

An appratus and a method for controlling initialization of a processor system having a memory device which reads data based on a memory request signal and outputs the read data to a data bus and having a processor which outputs the memory request signal based on a reset signal, to read an initialization program stored in the memory device. A detector detects the memory request signal output by the processor. A counter counts the memory request signals detected by the detector. A selector which has predetermined data provided, selects the data in accordance with the counting by the counter and outputs the selected data to the data bus as the initiation information.

16 Claims, 9 Drawing Sheets

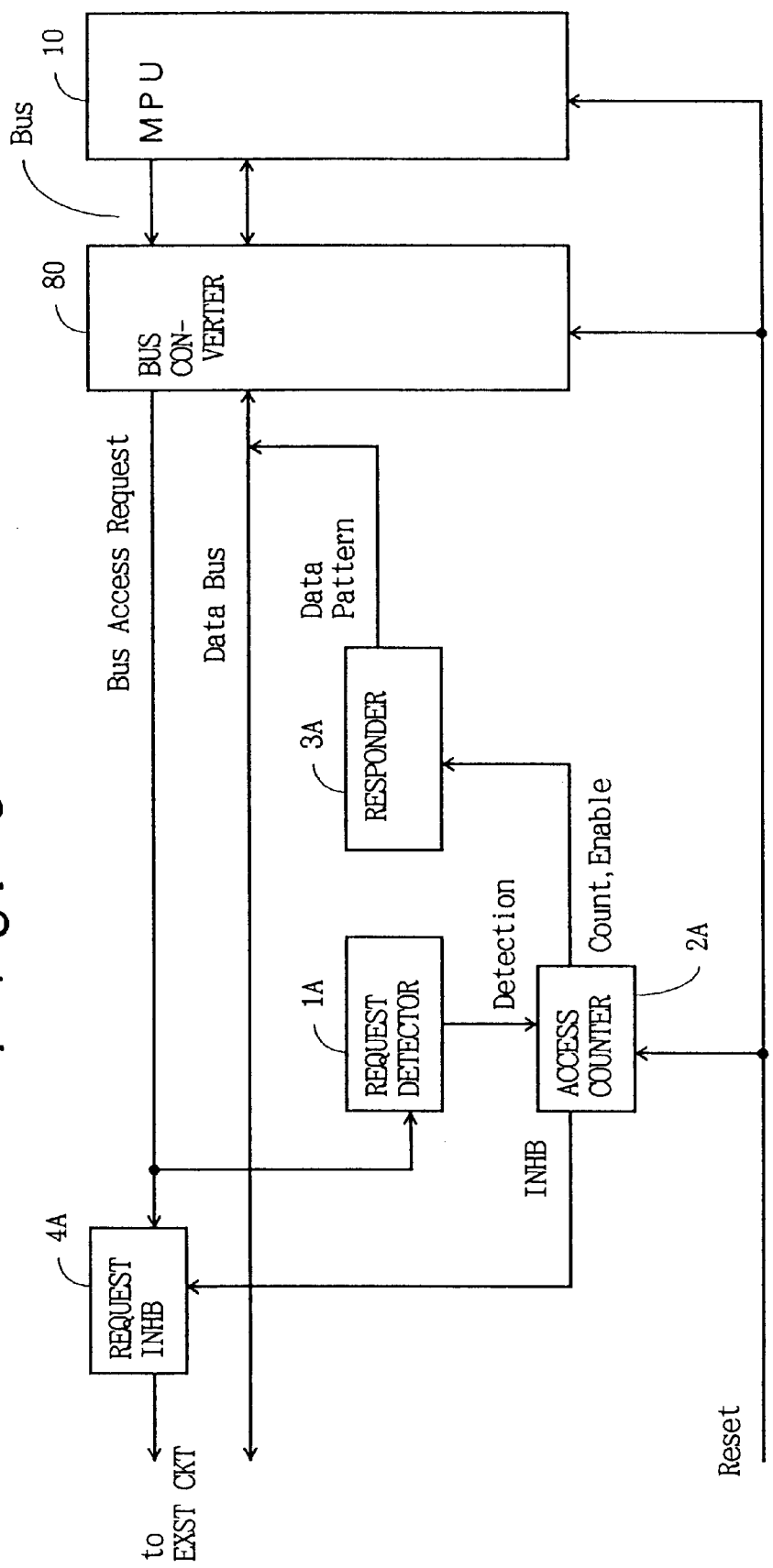

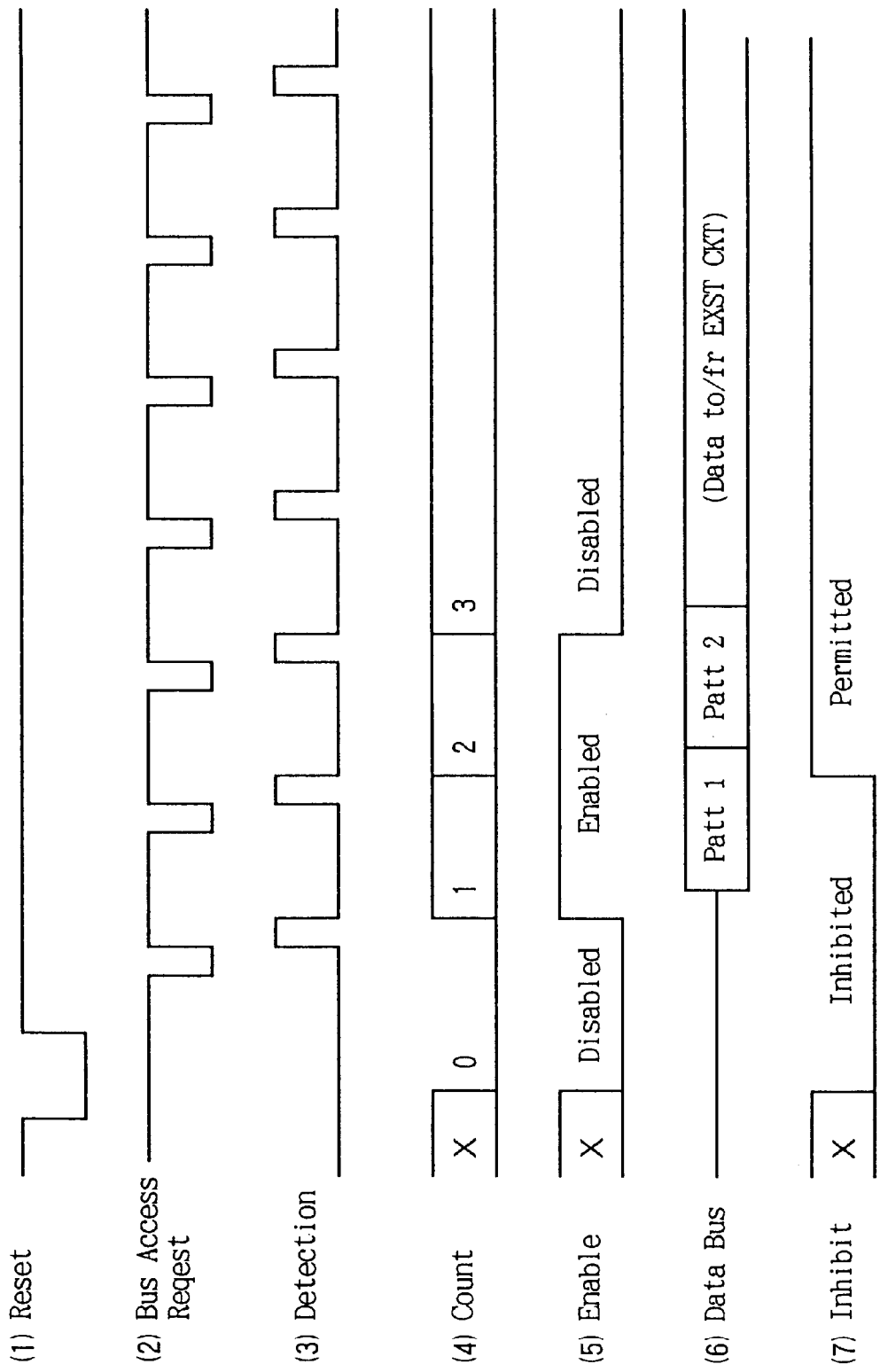

APPARATUS AND METHOD FOR CONTROLLING INITIALIZATION OF A PROCESSOR SYSTEM

BACKGROUND OF THE INVENTION

1. Field of the Invention

The present invention relates to an apparatus and a method for controlling a processor system, particularly for controlling initialization of a processor system.

When a processor system using a general-purpose microprocessor becomes short of processing capability, the microprocessor is usually replaced by a more powerful one to improve the performance of the system (called processor replacement). The usual method used in this case is to replace an old microprocessor which has been used so far by a new one which is higher of the series or more powerful of the same type. However, when the system is already equipped with the highest, i.e., most powerful microprocessor of the series, this method is useless.

Accordingly, to improve the system performance, a method is being practiced in recent years to replace the old microprocessor by a new one even if it is of a quite different type or architecture. The most serious problem when changing between microprocessors of different architecture is that operations to start an initialization program differ depending on the architecture. The initialization program sets various initial values in the system based on a power-on reset signal generated when power is turned on or based on a reset signal generated when a reset key on a keyboard or operator console is pressed. Therefore, an economical and effective apparatus and method for controlling initialization of a processor system is in great demand.

2. Description of the Related Art

FIGS. 1 and 2 show system configurations, particularly main memory configurations (i.e., memory maps), respectively of an old system having an old microprocessor and a new system having a new microprocessor which has replaced the old one. A bus converter (BUS CONV) is provided in the new system to overcome the architectural differences between the old and new microprocessors.

In FIG. 1, the old system has a control area allocated in the low-order address area for use by control circuits which control input and output devices for example, and has an initialization program allocated in the high-order address area. In FIG. 2 in contrast, the new system has the new microprocessor designed to store the initialization program in the low-order address area (e.g., the area starting with address 0) and eventually, the initialization program area overlaps with the aforesaid control area originally allocated for the old system.

The bus converter in FIG. 2 converts the bus construction and protocol of the new microprocessor so that it looks logically and operationally the same as the old one from the main memory controller, control circuits, external bus interface controller and devices connected thereto (hereinafter generally called existing circuits).

Thus, the bus converter may solve the problems with normal operations such as access operations between the processor and existing circuits. However, if the new (or replacing) microprocessor has peculiar operations differing from the old (or replaced) one, as in interrupt processing, exception processing, external register access and reset operations, a problem how to overcome the above operational differences remains even with the bus converter.

A reset operation re-sets the system to an initial state based on a power-on reset signal output when power is turned on or a reset signal output when a reset key is pressed (hereinafter, generally called a reset signal). For the interrupt processing, exception processing and external register access operations, the aforesaid differences can often be overcome by means of memory address allocation, protocol conversion and introduction of a virtual space. Moreover, those means might often be executed in the initialization program. However, the problem with the reset operation cannot be solved so easily even by these means.

The reset operation executes the initialization program to set the system to an initial state based on the reset signal. The reset operation starts the initialization operation from a predetermined unique address called an operation-starting address, which differs from a general-purpose microprocessor to another. For example, a microprocessor starts the operation from address 00000000, whereas another starts from FFFFF000 and still another from FF000000 and so forth.

As for a 32-bit microprocessor, the address space amounts to as huge as 2 to the 32th power (approx. 4 billions or 4,000,000,000). Usual systems use only a part of this huge space for a main memory and therefore, there is a possibility that:

(1) an address space where the main memory is not provided for the old system (the space outside of the main memory area in FIG. 2) may be the operation-starting address for the new processor, or (2) an address area which is already allocated as the control area for the old system overlaps with the operation-starting address of the new processor.

Conventionally, the following measures were taken, respectively against above cases (1) and (2):

(1) A memory device was newly added for an area including the operation-starting address, i.e., for the initialization program area.

(2) An address converter circuit was provided additionally in the bus converter to forcibly convert the address of the initialization program of the new system into that of the old system only when the initialization program was running, i.e., during the reset operation. Then, when the program was completed, the address converter circuit was stopped converting to restore to normal addressing.

Therefore, a problem is that it is uneconomical to add a memory device for the initialization program area according to method (1) because it requires a great amount of hardware and the area where the initialization program was originally stored is left unused. Another problem is that providing the address converter circuit according to method (2) not only increases hardware amount in itself, but renders the circuitry complex and causes a decrease in operation speed of the system in a normal mode, thus making the system uneconomical and decreasing the. system performance.

SUMMARY OF THE INVENTION

It is an object of the present invention to provide an apparatus and a method for controlling initialization of a processor system, which can achieve the reset operation economically, efficiently and effectively even when old and new processors differ in architecture from each other.

To achieve the above and other objects, the present invention provides detector means and generator means.

In an apparatus for controlling initialization of a processor system having a memory device which reads data and outputs the read data to a data bus based on a memory request signal and having a processor which outputs the memory request signal to read an initialization program stored in the memory device based on a reset signal, the detector means detects the memory request signal output by the processor. Based on the detection by the detector, the generator means generates initiation information for starting the initialization program and outputs the information to the data bus.

BRIEF DESCRIPTION OF THE DRAWINGS

FIG. 5 is a block diagram illustrating the first embodiment of the present invention;

FIG. 6 is a timing chart illustrating the first embodiment of the present invention;

Throughout the above-mentioned drawings, identical reference numerals are used to designate the same or similar component parts.

DESCRIPTION OF THE PREFERRED EMBODIMENTS

After reset by the reset signal, the first information (hereinafter called initiation information) that a microprocessor reads in is associated with the operation-starting address required for starting the reset operation, i.e., the initialization program. The information may be an instruction to be executed first for a certain microprocessor, it may be a memory address where the instruction to be executed first is stored for another and so on depending on the microprocessor. However, it is common to all the processors that the initiation information is read by the processors first following the reset signal and is not needed afterwards in the normal mode.

Figure 1:
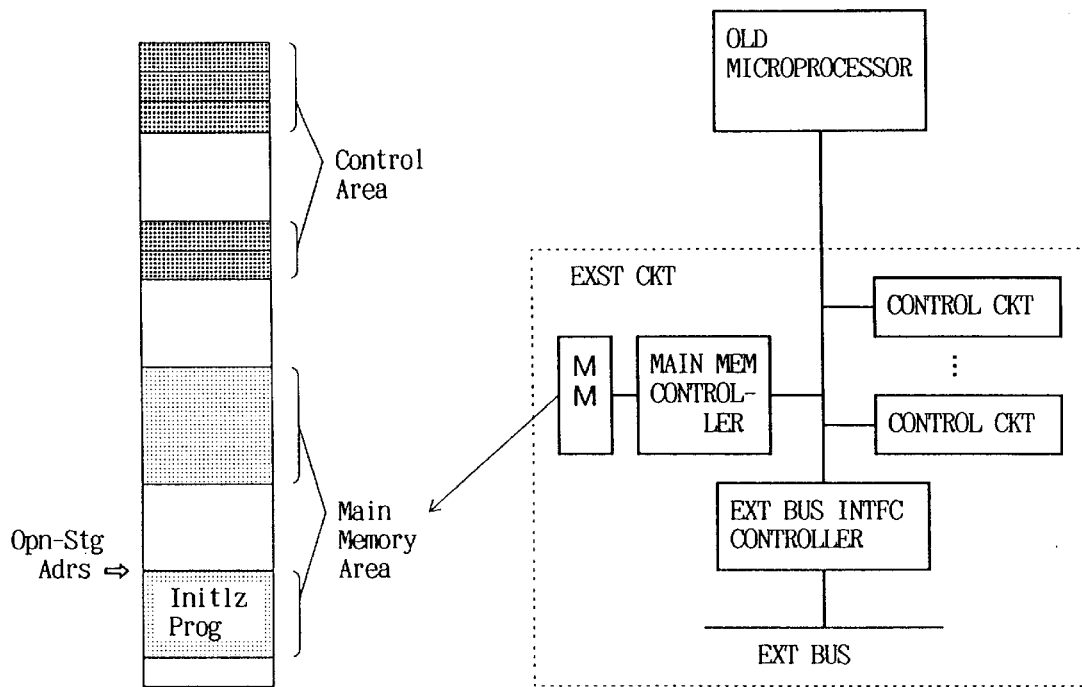
FIG. 1 shows main memory configuration of an old system having an old microprocessor.
Figure 2:
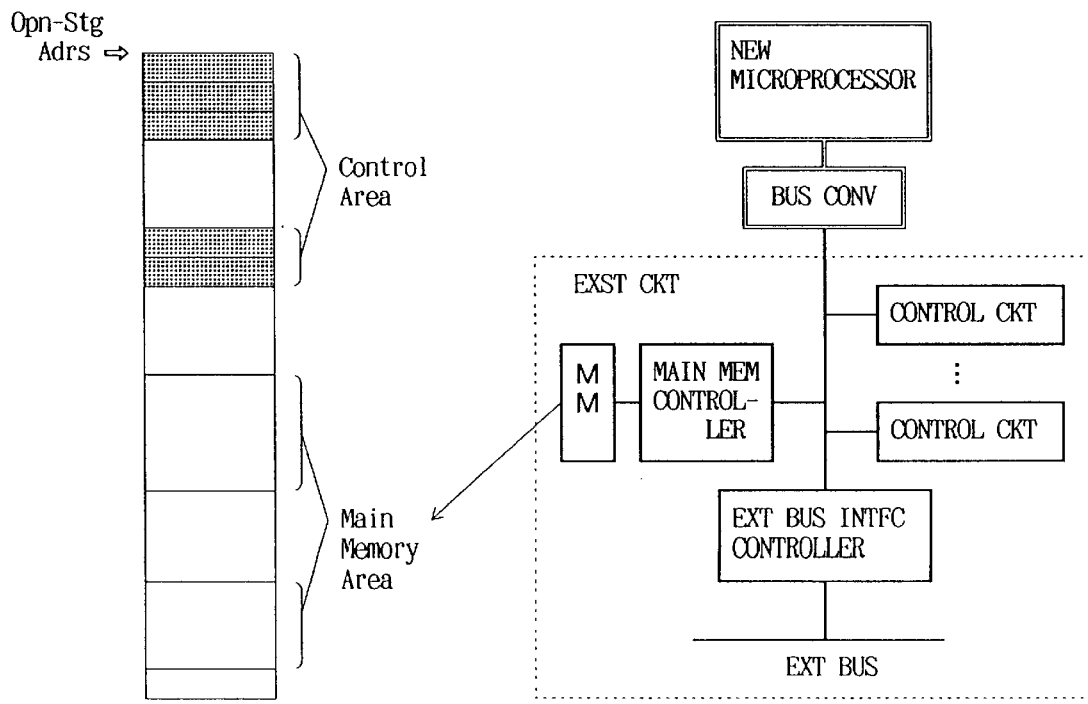
FIG. 2 shows main memory configuration of a new system having a new microprocessor.
Figure 3:
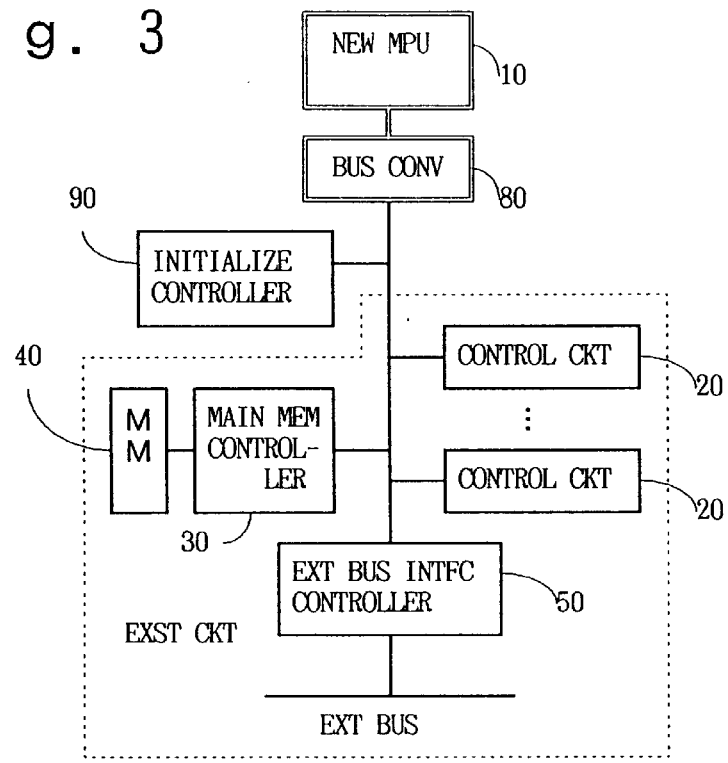
FIG. 3 shows a system configuration to which the present invention is applied.

FIG. 3 shows a system configuration to which the present invention is applied. The system has a new microprocessor (abbreviated to MPU) 10 which has replaced the old one to renew the old system to a new system and has an initialize controller 90.

By making the best use of the aforesaid microprocessor operations following the reset signal, the present invention provides the initialize controller 90 for responding only to the first one or several bus access request signals output by MPU 10 following the reset signal.

The initialize controller 90 responds to the request signal with an instruction code meaning "Jump to address XX" for a certain type of microprocessor or with address information XX meaning "start an instruction at address BB" for another, for example. Thus, the present invention can direct the MPU's memory access to the initialization program area starting with address XX which was allocated for the old system, without requiring a special address converter circuit as was the case with the conventional method and therefore making an effective use of the existing main memory.

Figures 4A, 4B:
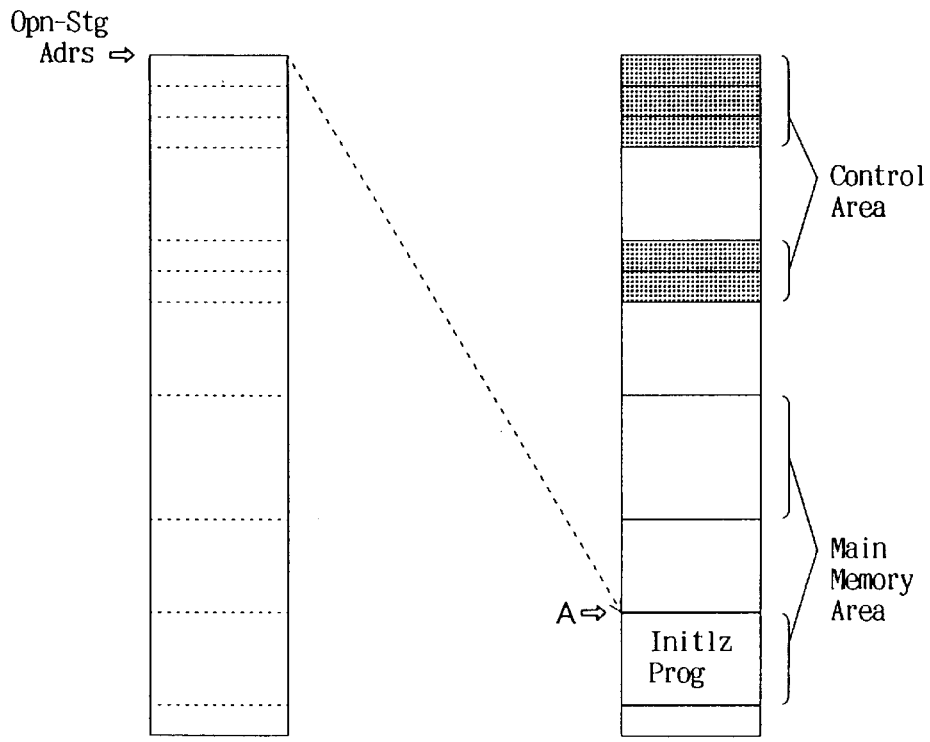
FIG. 4A and FIG. 4B show memory maps illustrating the operational principle of the present invention.

FIG. 4A and FIG. 4B show memory maps illustrating the operational principle of the present invention, particularly memory map images when the initialize controller 90 is working and has stopped, respectively. FIG. 4B also shows the memory map of the old system simultaneously. It is assumed that the initialization program for the old microprocessor resided in a high-order address area starting with address A as the operation-starting address (FIG. 4B). In contrast, it is assumed that the initialization program for the new MPU 10 is to reside in an area with address 0 as the operation-starting address (FIG. 4A); however, this area overlaps inconveniently with the control area (FIG. 4B shaded area) which is already allocated as the control area for the old system.

The initialize controller 90 inhibits the first one or several memory access request signals output by MPU 10 following the reset signal, from accessing main memory 40. Instead, it responds to the request signals with predetermined data such as an instruction code "Jump to address A" or address information A meaning "Start an instruction at address A" depending on the type of the new MPU 10, so as to make MPU 10 execute an instruction at address A.

Here, the initialize controller 90 need only respond to the request signal with aforesaid predetermined data without need to recognize-whether the addressing by the request signal is directed to the operation-starting address or to the control area. When the initialize controller 90 has thus responded, the address at which MPU 10 fetches an instruction is set to address A and thereafter, MPU 10 automatically starts executing the initialization program from address A. Therefore, there is no need for the new system to change the memory configuration or memory allocation of the old system, as shown in FIG. 4B.

FIG. 5 is a block diagram illustrating the first embodiment of the present invention. A bus converter 80 converts the bus construction and protocol of the new microprocessor MPU 10 so that MPU 10 looks logically and operationally the same as the old one from the main memory controller 30, control circuits 20, external bus interface controller 50 and devices connected thereto (hereinafter generally called existing circuits) shown in FIG. 3.

The initialize controller 90 shown in FIG. 3 consists of a request detector 1A, access counter 2A, responder 3A and request inhibitor 4A. The request detector 1A outputs a detection signal by detecting the bus access request signal (simply called Request signal) which MPU 10 outputs following the Reset signal to access the main memory.

The responder 3A has a data pattern (e.g., patterns 1 and 2) pre-set therein and in response to the Request signal of the MPU 10, selectively outputs one of the data patterns onto a Data Bus of the bus interface (simply called bus) depending on the count by the later-described access counter 2A.

The request counter 2A resets the count (e.g., to 0) based on the Reset signal, counts the Detection signals (i.e., Request signals) up to a predetermined maximum (e.g., 3) and outputs the count to the responder 3A. It also outputs an Enable signal for enabling the responder 3A to output the data pattern to the Data Bus and an Inhibit signal according to the count. Based on the Inhibit signal, the request inhibitor 4A, which is required in case the initialization program area overlaps with the control area, inhibits the Request signal from going to the existing circuits.

FIG. 6 is a timing chart illustrating the first embodiment of the present invention. The operation of the first embodiment is explained based on FIG. 6 referring to FIG. 5.

(1) The Reset signal, which is output for a certain period when power is turned on or when the reset key is pressed, resets circuits within the system.

(2) Based on the Reset signal, MPU 10 outputs the Request signals successively to read (or fetch) the instructions constituting the initialization program.

(3) When detecting the Request signal, the request detector 1A outputs the Detection signal.

(4) The access counter 2A resets the count to 0 based on the Reset signal and every time the Detection signal occurs, counts up to the maximum (e.g., 3) while outputting the counts (0–3) as a Count signal.

(5) The access counter 2A also outputs the Enable signal which enables the responder 3A to output the data patterns to the Data Bus.

(6) Based on the Enable signal, the responder 3A selects one of the data patterns (e.g., pattern 1 or 2) depending on the Count signal (1 or 2) and responds to the Request signal with the selected data pattern onto the Data Bus.

(7) The access counter 2A generates the Inhibit signal according to the count (0 or 1 here). Based on the Inhibit signal, the request inhibitor 4A inhibits the first two Request signals from reaching the existing circuits.

Thus, the initialize controller 90 inhibits the first two Request signals from reaching the existing circuits and instead, responds to MPU 10 with patterns 1 and 2. Therefore, in the example of FIG. 4A, if the patterns 1 and 2 are previously encoded to constitute an instruction code "Jump to address A" for example, MPU 10 starts instruction execution from address A. Thus, MPU 10 automatically executes the initialization program stored in the area starting with address A.

Thus, even when the initialization program area designed for the new MPU 10 to overlap with the the control area for the old system, the reset operation can easily be accomplished without adding the large-scale converter circuit or changing the memory allocation of the control area, as was the case with the conventional method.

Figure 7:
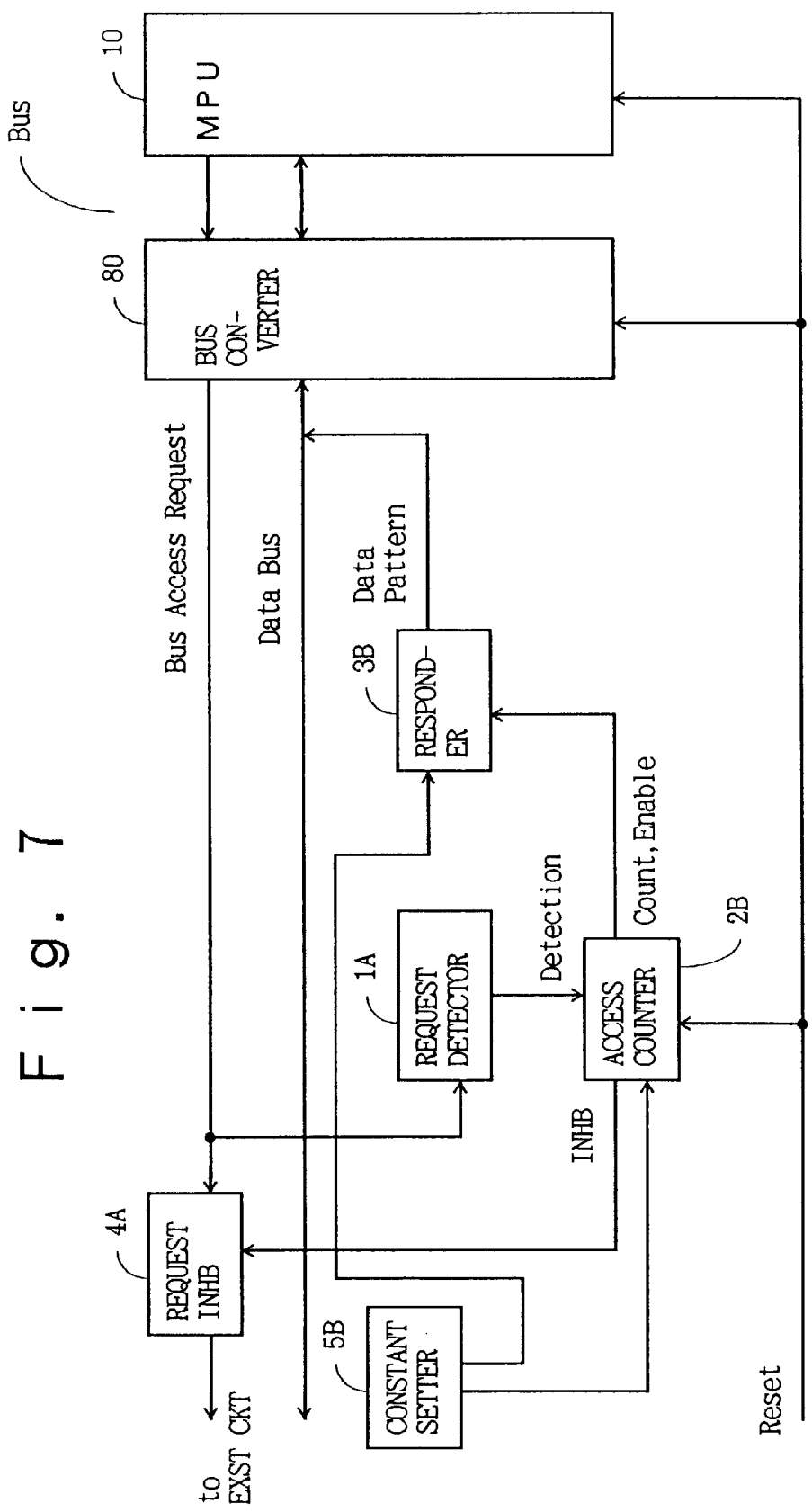
FIG. 7 is a block diagram illustrating the second embodiment of the present invention.

FIG. 7 is a block diagram illustrating the second embodiment of the present invention, which is a modification of the first embodiment. A constant setter 5B selectively sets a constant as the maximum count for the access counter 2B.

In the first embodiment, the maximum count of the access counter 2A is fixed to 3 and data patterns 1 and 2 are generated corresponding to the counts 1 and 2. However, in the second embodiment, the maximum count is variably set and therefore, the responder 3B can generate any number of predetermined data patterns, if prepared previously.

For example, let us assume that the constant setter 5B sets a constant 4 as the maximum count so as to have the access counter 2B count 0 to 4 and output the Enable signal during the counts 1–3 and that the responder 3B has data patterns 1–3 provided. Then, the responder 3B can respond with data patterns 1–3 corresponding to the counts 1–3.

Moreover, let us assume that the constant setter 5B sets constants i and m as an initial value and maximum count so that the access counter 2B initializes the count to i based on the Reset signal and counts the Detection signals up to the maximum m. Let us also assume that the responder 3B has data patterns 1–4 previously prepared. For example, setting i=2 and m=5 in the constant setter 5B allows the responder 3B to respond to the Request signal with patterns 3 and 4. Also, to respond with patterns 1 and 2 as in the first embodiment, the constant setter 5B need only set i=0 and m=3 therein.

Thus, by constructing the responder 3B so as to hold plural data patterns and the access counter 2B so as to set any values as the initial value and maximum count, any one can be selected from the plural data patterns. Accordingly, the initialize controller of the present invention can cope with several times of processor replacements without redesigning the controller itself.

Figure 8:
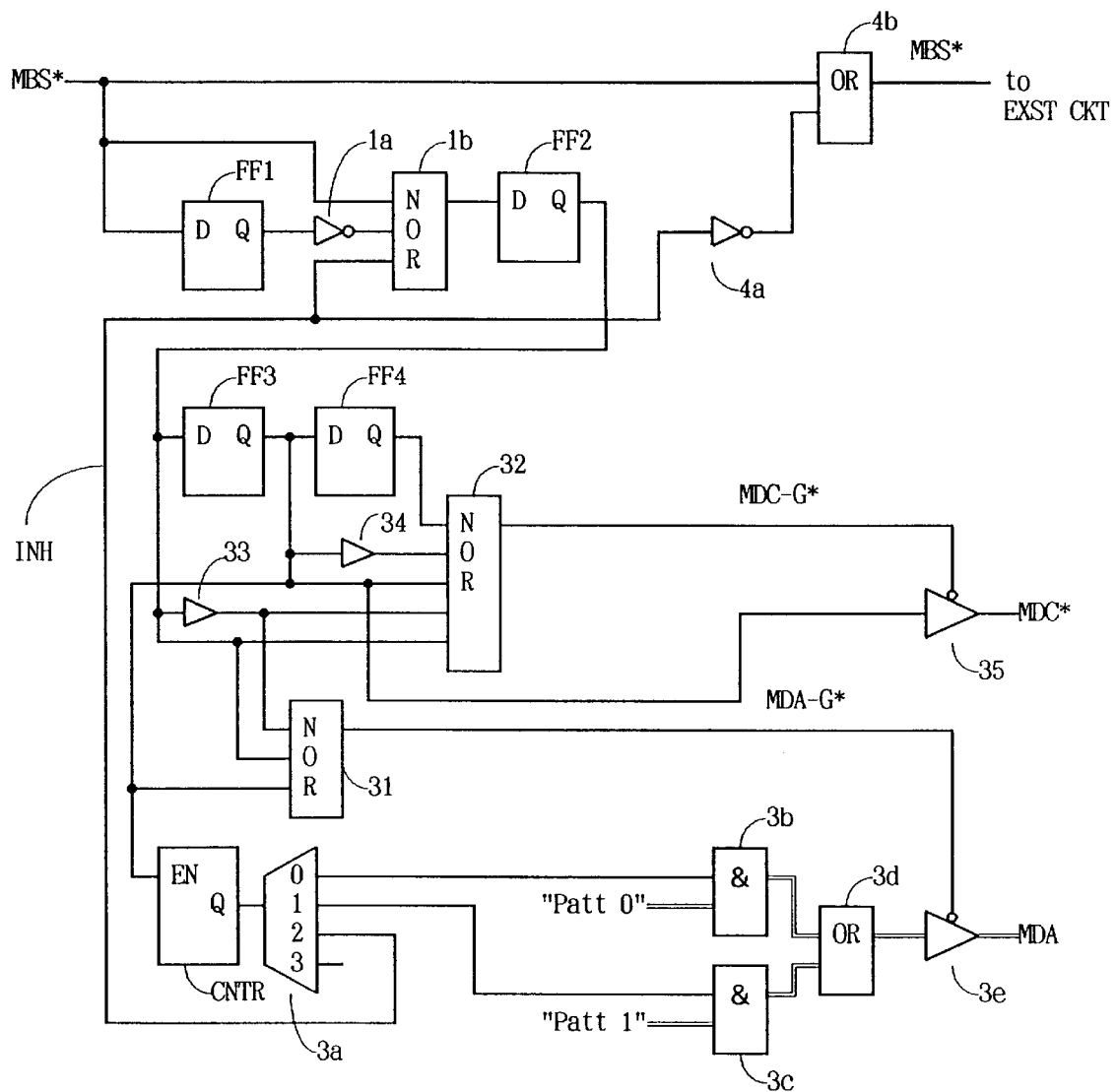
FIG. 8 is detailed circuit diagram of the initialize controller shown in FIG. 5.

FIG. 8 is detailed circuit diagram of the initialize controller shown in FIG. 5. MBS*, MDC* and MDA, which are bus interface (simply shown as Bus in FIGS. 5 and 7) signals between MPU 10 (or bus converter 80) and the existing circuits, represent the Bus Access Request, Bus Access Completion and Data Bus signals, respectively.

The request detector 1A shown in FIG. 5 consists here of D-type flip-flops (abbreviated to FFs) 1–4, inverter 1a and NOR gate 1b. The access counter 2A consists of a counter CNTR. The responder 3A consists of a decoder 3a, AND gates 3b–3c, OR gate 3d and tri-state buffer 3e. A circuit for controlling the responder 3A so as to output a response onto the Data Bus MDA, consists of NOR gates 31–32, buffer 33–34 and tri-state buffer 35. The request inhibitor 4A consists of an inverter 4a and an OR gate 4b.

Figure 9:
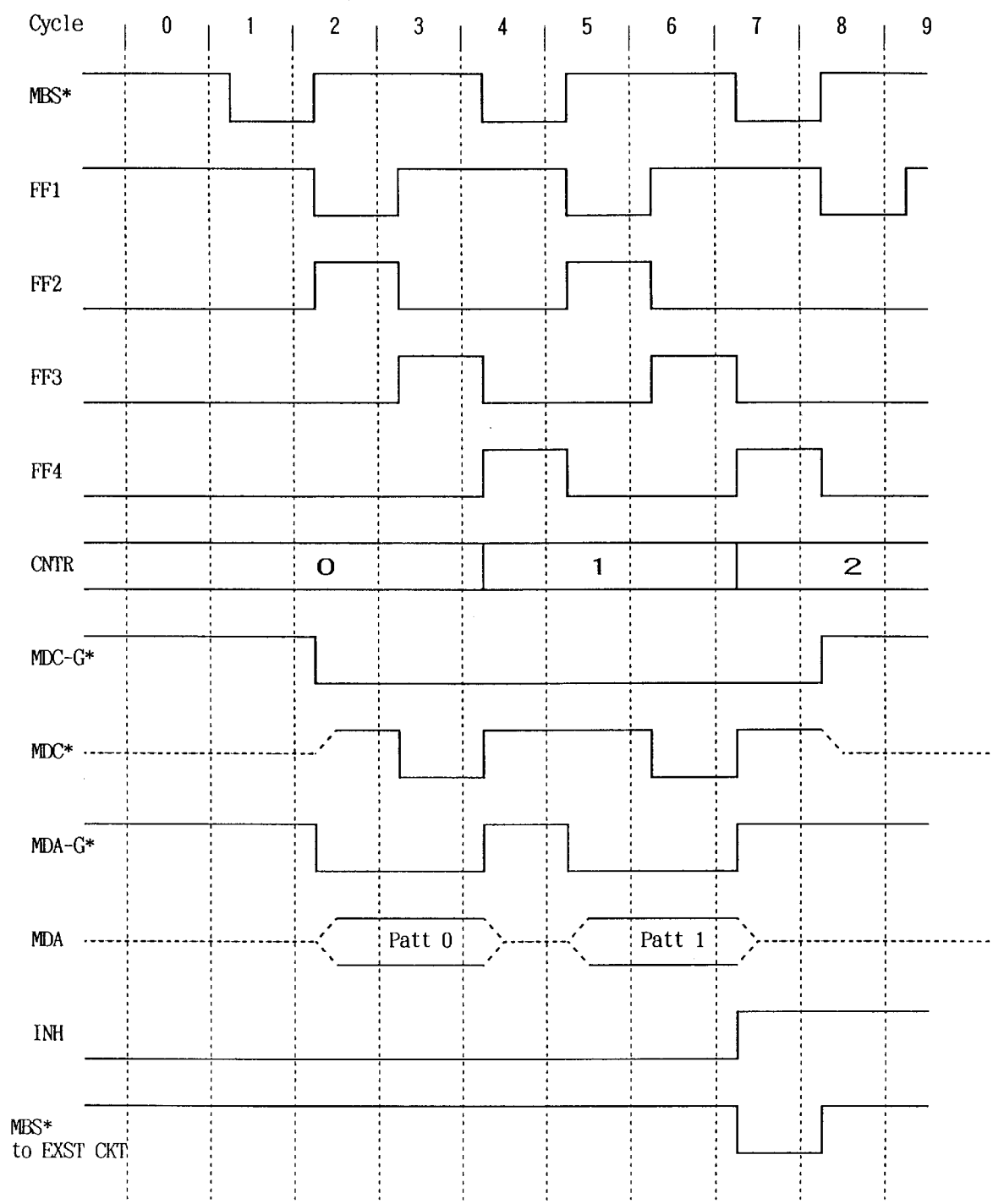
FIG. 9 is a timing chart illustrating the operation of the FIG. 8 circuits.

FIG. 9 is a timing chart illustrating the operation of the FIG. 8 circuits. The sequence of the bus access starts from the time MBS* becomes low (or L) for 1 cycle and ends when the MBC* becomes L for 1 cycle. A signal followed by an asterisk (*) is low-active.

(1) The timing at which MPU 10 outputs the first Bus Access Request MBS* following the Reset signal is assumed to be cycle 1.

(2) In cycle 2, MBS* is delayed by flip-flop FF1 by 1-cycle time. Since the count of counter CNTR has not yet reached value 2, FF2 becomes high (or turns on) indicating that a bus access sequence has started. When FF2 turns on, both MDC-G* and MDA-G* signals become L (or turn off) to turn the corresponding tri-state buffers 35 and 3e "enable". Thus, the buffers 35 and 3e are ready to output the Bus Access Completion signal MDC* and the data pattern as the Data Bus signal. Since counter CNTR, provides count 0 in cycle 2, the responder 3A outputs "pattern 0".

(3) In cycle 3, flip-flop FF3 turns on and tri-state buffer 35 gates out FF3 output so as to output MDC*, indicating that the bus access has completed.

(4) In cycle 4, FF3 turns off, counter CNTR counts up to 1 and FF4 turns on. When FF3 turns off, MDA-G* turns H (disabled) to end outputting data pattern 0. As counter CNTR counts up to 1 with the decoder 3a providing count 1, the responder 3A changes its output from pattern 0 to pattern 1. It is assumed that in cycle 4, MPU 10 starts the next bus access by outputting MBS*, following the MDC* replied in cycle 3.

(5) In cycle 5, FF4 turns off and FF2 turns on as in cycle 2, indicating that a bus access sequence has started again. FF2 turning on renders MDC-G* and MDA-G* "enable" to make the buffers 35 and 3e ready to output MDC* and the data pattern, respctively.

(6) In cycle 7, tri-state buffer outputs MDC* as in cycle 3.

(7) In cycle 7, FF3 turns off as in cycle 4, counter CNTR counts up to 2 and FF4 turns on. When FF3 turns off, MDA-G* becomes H (disable) and the responder 3A ends outputting the data patterns. Since an Inhibit (INH) signal becomes H as counter CNTR counts up to 2, the FF2 input is forced to L to inhibit the Request signal from being detected and OR gate 4b changes from forcibly outputting H to gating MBS* out. Assuming that MPU 10 starts the next bus access immediately after MDC* which was output in cycle 6, MBS* is permitted to go to the existing circuits in cycle 7 and later.

(8) Since the INH signal is forced to H from cycle 8 on, FF2 does not turn on (i.e., the Request signal is not detected) even if MBS* is received from MPU 10 and the initialize controller 90 will not operate until another Reset signal is received again.

Figure 10:
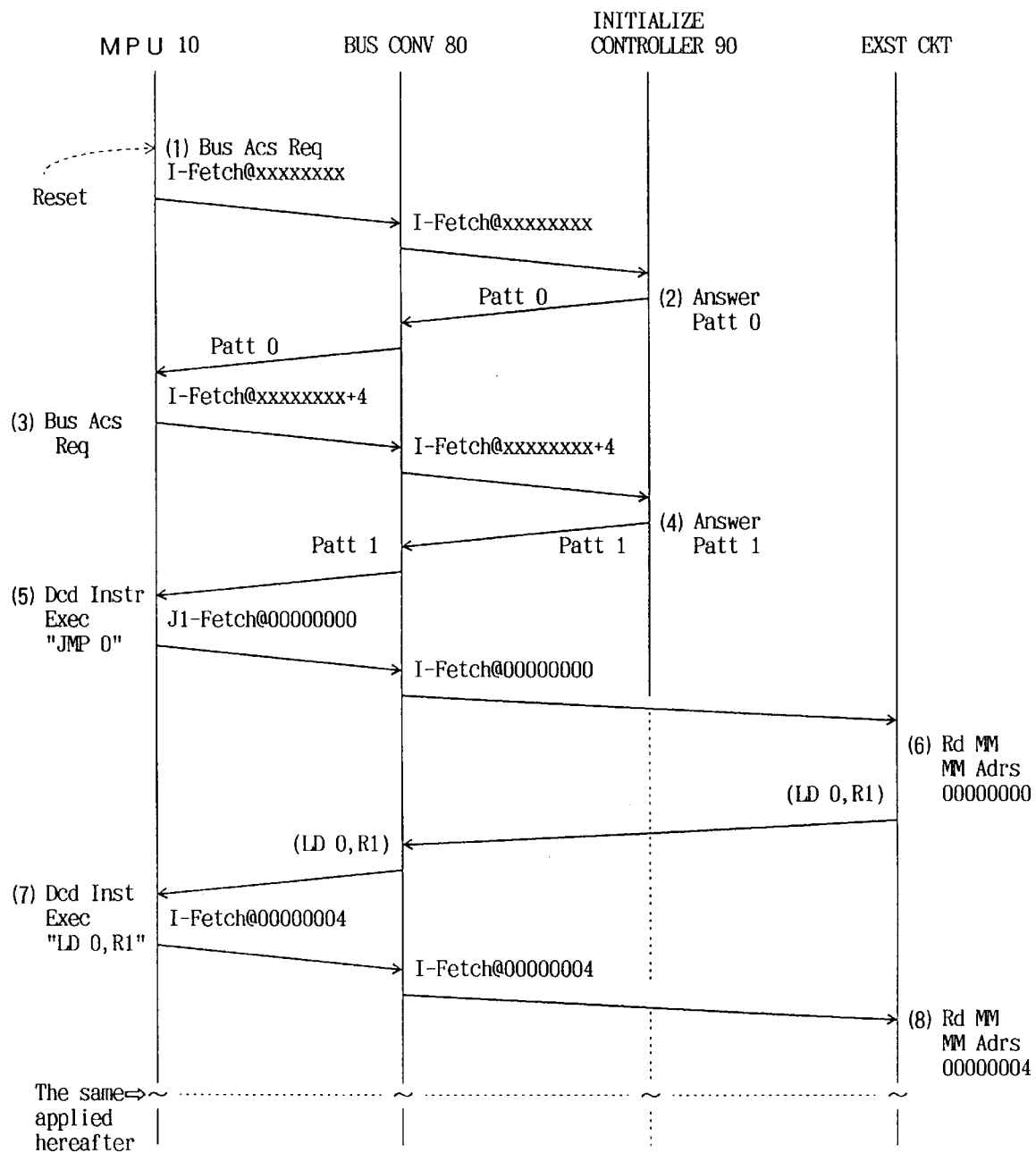
FIG. 10 is a sequence chart illustrating the operation of the initialize controller of the present invention.

FIG. 10 is a sequence chart illustrating the operation of the initialize controller of the present invention. The operation of the initialize controller 90 is explained based on FIG. 10, referring to FIGS. 5–9. It is assumed that the initialization-program operation-starting address (here, the head address of the program area) designed for the old MPU is hexadecimal 00000000 and that for the new MPU is hexadecimal xxxxxxxx. Here, a word consists of 4 bytes (16 bits) and x is an irrelevant hexadecimal number.

(1) On receiving the Reset signal, MPU 10 attempts to fetch the first one word of the first instruction of the initialization program by outputting the Bus Access Request signal (I-Fetch@xxxxxxxx) to the Bus, specifying the memory address xxxxxxxx where the first one word is stored. The Request signal is received by the initialize controller 90 via the bus converter 80. Hereinafter, the bus converter 80 is not referred to since it does nothing active particularly other than converting the bus protocol between MPU 10 and the existing circuits.

(2) The initialize controller 90 responds to (or answers) the Request signal with the first data pattern 0 according to the current count 0 of the counter CNTR, regardless of the memory address xxxxxxxx and without even accessing the main memory 40. Thereafter, the counter CNTR counts up to 1.

(3) MPU 10 outputs the Request signal (I-Fetch@xxxxxxxx+4) to the Bus, specifying the memory address xxxxxxxx+4 to fetch the second one word of the first instruction. The Request signal is received by the initialize controller 90.

(4) The initialize controller 90 responds to MPU 10 with the second data pattern 1 according to count 1 of the counter CNTR, regardless of the memory address xxxxxxxx+4. Then, the counter CNTR counts up to 2. Thereafter, the request detector 1A stops detecting the Request signal and the request inhibitor 4A does not inhibit the Request signal, but passes it to the existing circuits.

(5) MPU 10 decodes the instruction code consisting of patterns 0 and 1 and interprets the instruction to be "Jump to address 0" (JMP 0), for example. According to the JMP 0 instruction, MPU 10 outputs the Request signal (JI-Fetch@00000000) to the Bus, specifying the memory address 00000000 so as to fetch an instruction at address 00000000 (i.e. the head address of the initialization program).

(6) The Request signal is input to main memory 40 of the existing circuits via the Bus. The main memory 40 reads data at address 00000000 and outputs the read data to the Bus.

(7) MPU 10 decodes the data received from the Bus as an instruction and executes the decoded instruction (e.g., "Load a value 0 in general register 1": LD 0, R1). Then MPU 10 outputs the Request signal (I-Fetch@00000004) to the Bus, specifying memory address 00000004 to fetch the next instruction.

(8) The main memory 40 reads data at address 00000004 and sends the read data to the Bus. Thereafter, MPU 10 repeats similar operations to execute the initialization program.

Figure 11:
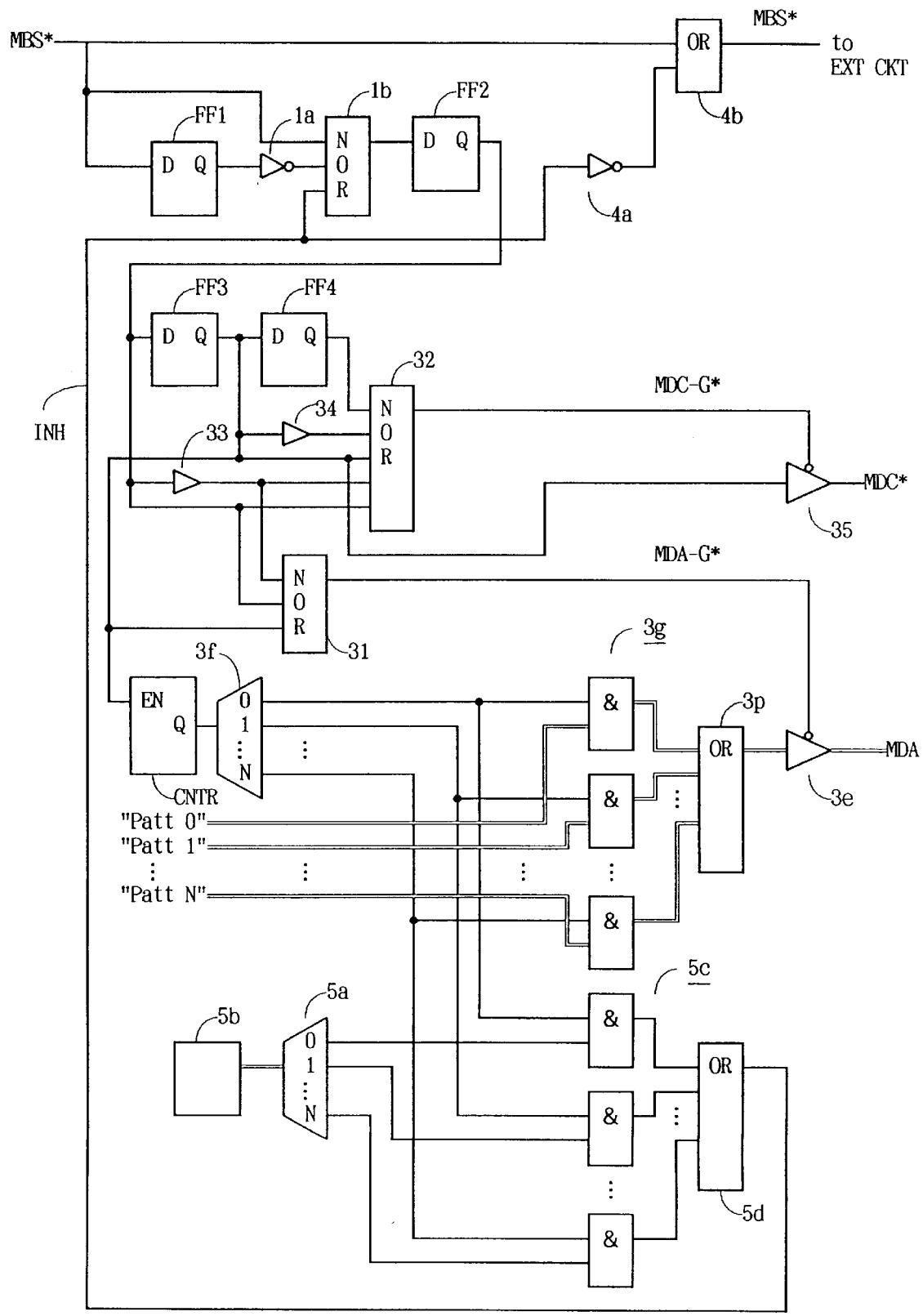
FIG. 11 is a detailed circuit diagram of the initialize controller shown in FIG. 7.

FIG. 11 is a detailed circuit diagram of the initialize controller shown in FIG. 7. A major difference between the initialize controller in FIG. 11 and that in FIG. 9 is that the former has circuitry (decoder 3f, N+1 AND gates 3g and OR gates 3p) for providing data patterns 0–N and circuitry (jumper circuit 5b, decoder 5a and N+1 AND gates 5c and OR gates 5d) for setting a maximum count N for counter CNTR.

Thus, since the maximum count can be set to any value, the responder 3B can generate any number of predetermined data patterns previously prepared. If he maximum count is set to 4 for example, the access counter 2B counts 0 to 4 and outputs the Enable signal while counting 1 to 3. Therefore, by previously preparing data patterns 1–3, the responder 3B can respond with the data patterns 1–3 according to the counts 1–3.

As explained above, according to the present invention, which can also be realized by firmware, the initialize operation can easily be achieved without need to add memory device for storing the initialization program. It can also be achieved without need to add the large-scale address converter circuit or change the memory allocation for the existing circuits even when the initialization program area designed for a new processor overlaps with the control area for the old system. Further, once configured in the system, the initialize controller can cope with some times of processor replacements just by changing the constant setting, without need to re-design itself since any data pattern can be selected from plural ones for starting the initialization program.

Thus, the present invention can provide an apparatus and a method for controlling initialization of a processor system, which can achieve the reset operation economically, efficiently and effectively even when replacing and replaced processors differ in architecture from each other.

What is claimed is:

1. An apparatus for controlling initialization of a processor system having a memory device which, based on a memory request signal, reads data and outputs the read data to a data bus and having a processor which, based on a reset signal, outputs the memory request signal to read an initialization program stored in the memory device, said apparatus comprising:

detector means for detecting the memory request signal output by the processor in response to the reset signal; and generator means, based on the detection by said detector means, for generating initiation information for starting the initialization program and returning the initiation information to the processor by outputting the information to the data bus.

2. The apparatus according to claim 1, wherein the initiation information specifies an operation-starting address in the memory device with which address the initialization program starts or an instruction instructing to jump to the operation-starting address.

3. The apparatus according to claim 1, wherein said generator means comprises:

counter means for counting the memory request signals detected by said detector means; and selector means having predetermined data provided, for selecting the data in accordance with the counting by said counter means and outputting the selected data to the data bus as the initiation information.

4. The apparatus according to claim 3, wherein said detector means stops detecting the memory request signal in accordance with the counting by said counter means.

5. The apparatus according to claim 3, wherein said counter means further comprises:

first provision means for providing a first value; and wherein said counter means sets the first value as an initial value of the count.

6. The apparatus according to claim 3, wherein said counter means further comprises:

second provision means for providing a second value; and wherein said counter means sets the second value as a maximum of the count.

7. The apparatus according to claim 3, further comprising:

inhibitor means for inhibiting the memory request signal from going outside of said apparatus while said apparatus is controlling the initialization.

8. The apparatus according to claim 7, wherein said inhibitor means inhibits in accordance with the counting by said counter means.

9. A method for controlling initialization of a processor system having a memory device which, based on a memory request signal, reads data and outputs the read data to a data bus and having a processor which, based on a reset signal, outputs the memory request signal to read an initialization program stored in the memory device, said method comprising the steps of:

(a) detecting the memory request signal output by the processor in response to said request signal; and (b) based on the detection, generating initiation information for starting the initialization program and returning the initiation information to the processor by outputting the information to the data bus.

10. The method according to claim 9, wherein the initiation information specifies an operation-starting address in the memory device with which address the initialization program starts or an instruction instructing to jump to the operation-starting address.

11. The method according to claim 9, wherein said generating in step (b) comprises the steps of:

(c) counting the memory request signals detected by step (a); and (d) having predetermined data provided, selecting the data in accordance with said counting by step (c) and outputting the selected data to the data bus as the initiation information.

12. The method according to claim 11, wherein said detecting by step (a) stops detecting the memory request signal in accordance with counting by step (c).

13. The method according to claim 11, wherein said counting by step (c) further comprises the steps of:

(e) providing a first value; and wherein said counting by step (c) sets the first value as an initial value of said counting.

14. The method according to claim 11, wherein said counting by step (c) further comprises the steps of:

(f) providing a second value; and wherein said counting by step (c) sets the second value as a maximum of said counting.

15. The method according to claim 11, further comprising the steps of:

(g) inhibiting the request signal from being input to the memory device while said method is controlling the initialization.

16. The method according to claim 15, wherein said inhibiting by step (g) inhibits in accordance with said counting by step (c).

* * * * *